United States Patent
Okita et al.

(10) Patent No.: US 10,090,789 B2
(45) Date of Patent: Oct. 2, 2018

(54) MOTOR CONTROL DEVICE, MOTOR CONTROL METHOD, AND NON-TRANSITORY COMPUTER READABLE MEDIUM ENCODED WITH COMPUTER PROGRAM

(71) Applicant: FANUC CORPORATION, Yamanashi (JP)

(72) Inventors: Tadashi Okita, Yamanashi (JP); Yuuki Morita, Yamanashi (JP); Daisuke Tajima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/657,516

(22) Filed: Jul. 24, 2017

(65) Prior Publication Data

US 2018/0034391 A1    Feb. 1, 2018

(30) Foreign Application Priority Data

Jul. 27, 2016  (JP) .................................. 2016-147300

(51) Int. Cl.
| | | |
|---|---|---|
| H02P 6/18 | (2016.01) | |
| H02P 27/06 | (2006.01) | |
| H02P 21/18 | (2016.01) | |
| H02P 6/16 | (2016.01) | |
| H02P 1/40 | (2006.01) | |
| H02P 23/14 | (2006.01) | |

(52) U.S. Cl.
CPC ............... *H02P 6/18* (2013.01); *H02P 1/40* (2013.01); *H02P 6/16* (2013.01); *H02P 21/18* (2016.02); *H02P 23/14* (2013.01)

(58) Field of Classification Search
None
See application file for complete search history.

(56) References Cited

U.S. PATENT DOCUMENTS

2012/0013287 A1*  1/2012  Okita ..................... H02P 23/14
                                                                318/801

FOREIGN PATENT DOCUMENTS

JP          2004-260927 A       9/2004

* cited by examiner

*Primary Examiner* — Bentsu Ro
*Assistant Examiner* — Zemenay Truneh
(74) *Attorney, Agent, or Firm* — Studebaker & Brackett PC

(57) ABSTRACT

To provide a motor control device capable of causing a motor to rotate in any rotation direction, even when leaving the connection state of the motor of a machine tool as standard. A motor control device (10) includes: a coordinate converter (36) as a voltage command output unit that outputs voltage command data instructing a voltage to be applied to a motor (14) based on an external instruction; a voltage command data interchanging unit (38) that outputs by interchanging or not interchanging the voltage command data, based on a setting for interchanging of a phase rotation of the voltage command data; a PWM output unit (40) as an amplifier that drives the motor (14) based on the voltage command data outputted by the voltage command data interchanging unit (38); a current detection unit (42) that detects the electric current flowing through the motor (14) and outputs current feedback data; and a current feedback data interchanging unit (44) that outputs by interchanging or not interchanging the current feedback data based on a setting for interchanging.

7 Claims, 6 Drawing Sheets

MOTOR CONTROL DEVICE, MOTOR CONTROL METHOD, AND NON-TRANSITORY COMPUTER READABLE MEDIUM ENCODED WITH COMPUTER PROGRAM

This application is based on and claims the benefit of priority from Japanese Patent Application No. 2016-147300, filed on 27 Jul. 2016, the content of which is incorporated herein by reference.

BACKGROUND OF THE INVENTION

Field of the Invention

The present invention relates to a motor control device that controls a motor of a machine tool, a motor control method, and a non-transitory computer readable medium encoded with a computer program.

Related Art

Conventionally, in the driving of a motor used by a machine tool, the rotation direction of the motor is determined according to the phase rotation pattern of electric power supplied to the motor, the switching pattern, which decides the rotation direction of the motor, etc.

For example, Patent Document 1 described below discloses an example of a motor control device whereby switching of the rotation direction is simple. The motor control device described in Patent Document 1 includes an interphase voltage detection circuit that detects the interphase voltage of an AC power unit; an inverter circuit that connects to the motor; and a control circuit that switches the inverter circuit based on the interphase pattern of voltage detected by the interphase voltage detection circuit, etc. According to Patent Document 1, by deciding the corresponding relationship between the interphase pattern of the power source and the switching pattern related to the motor of the inverter circuit (e.g., according to shifting of the connection of terminals of the power source), it is said to be possible to easily change the rotation direction of the motor.

However, from the convenience in the mounting direction of the spindle motor and the sensors for the spindle motor in a machine tool, it may be necessary to make the connection phase rotation of the motor drive device and motor power lines differ from standard. As shown in Patent Document 1, etc., it is necessary to switch the connection phase rotation of the power lines of a motor (deviate from standard) in order to switch the rotation direction of the motor. In addition, similarly to the motor sensors, it may be necessary to make a configuration in which the connection phase rotation differs from standard.

Patent Document 1: Japanese Unexamined Patent Application, Publication No. 2004-260927

SUMMARY OF THE INVENTION

However, in the case of the connection phase rotation of a part of the motors used by a machine tool differing from standard, the management and maintenance thereof becomes complicated. For example, in the case of maintenance personnel for machine tools discovering that the connection phase rotation of the motor differs from standard, it is assumed to be mistakenly determined that this differs due to a mistake, or being connected in the differing phase rotation is correct.

The present invention has been made taking account of this situation, and the object thereof is to provide a motor control device, motor control method, and non-transitory computer readable medium encoded with a computer program, that can cause the motor to rotate in any rotation direction, and can drive irrespective of the connection phase rotation of the motor power lines, even when keeping the connection state of the motor of a machine tool as standard.

In order to achieve the above-mentioned objects, a first aspect of the present invention is a motor control device for controlling a motor of a machine tool, including: a voltage command output unit (e.g., the coordinate converter 36 described later) that outputs voltage command data instructing a voltage to be applied to the motor, based on an external instruction; a voltage command data interchanging unit (e.g., the voltage command data interchanging unit 38 described later) that outputs the voltage command data by interchanging or without interchanging, based on a setting for interchanging of a phase rotation of the voltage command data; an amplifier (e.g., the PWM output unit 40 described later) that drives the motor based on voltage command data outputted by the voltage command data interchanging unit; a current detection unit (e.g., the current detection unit 42 described later) that detects electric current flowing through the motor, and outputs current feedback data; a current feedback data interchanging unit (e.g., the current feedback data interchanging unit 44 described later) that outputs the current feedback data by interchanging or without interchanging, based on a setting for interchanging of phase rotation of the voltage command data, in which the voltage command data interchanging unit interchanges the voltage command data, in a case of the setting for interchanging of the phase rotation of the voltage command data and the connection phase rotation of the motor being consistent, based on a set phase rotation for interchanging of the phase rotation of the voltage command data, and outputs the voltage command data as is without interchanging, in a case of the setting for interchanging of the phase rotation of the voltage command data and the connection phase rotation of the motor not being consistent, and in which the current feedback data interchanging unit interchanges the current feedback data, in a case of the setting for interchanging of the phase rotation of the voltage command data and the connection phase rotation of the motor being consistent, based on a set phase rotation for interchanging of the phase rotation of the voltage command data, and outputs the current feedback data as is without interchanging, in a case of the setting for interchanging of the phase rotation of the voltage command data and the connection phase rotation of the motor not being consistent.

According to a second aspect of the present invention, the motor control device as described in the first aspect may further include: a setting unit (e.g., the setting unit 48 described later) that sets a setting for interchanging of the phase rotation of the voltage command data, in which the setting unit may supply the setting for interchanging of the phase rotation of the voltage command data to the voltage command data interchanging unit, and the current feedback data interchanging unit.

According to a third aspect of the present invention, in the motor control device as described in the second aspect, the setting unit may detect the connection phase rotation of the motor, and supply the connection phase rotation of the motor to the voltage command data interchanging unit and the current feedback data interchanging unit.

According to a fourth aspect of the present invention, in the motor control device as described in any one of the first to third aspects, the voltage command data interchanging unit may output an alarm, in a case of the setting for interchanging of the phase rotation of the voltage command data and the connection phase rotation of the motor not being consistent.

According to a fifth aspect of the present invention, in the motor control device as described in any one of the first to third aspects, the voltage command data interchanging unit may output an alarm in a case of the setting for interchanging of the phase rotation of the voltage command data and the connection phase rotation of the motor not being consistent, and a command for flowing excitation current of the motor being outputted externally.

According to a sixth aspect of the present invention, a motor control method for controlling a motor of a machine tool, includes the steps of: outputting voltage command data that instructs a voltage to be applied to the motor, based on an external instruction; outputting by interchanging or not interchanging the voltage command data, based on a setting for interchanging of a phase rotation of the voltage command data; driving the motor based on the voltage command data outputted in the step of outputting by interchanging or not interchanging the voltage command data; detecting electric current flowing through the motor, and outputting current feedback data; and outputting by interchanging or not interchanging the current feedback data, based on the setting for interchanging of the phase rotation of the voltage command data, in which the step of outputting by interchanging or not interchanging the voltage command data includes: a step of interchanging the voltage command data, in a case of the setting for interchanging of the phase rotation of the voltage command data and the connection phase rotation of the motor being consistent, based on a set phase rotation for interchanging of the phase rotation of the voltage command data, and a step of outputting the voltage command data as is without interchanging, in a case of the setting for interchanging of the phase rotation of the voltage command data and the connection phase rotation of the motor not being consistent, and in which the step of outputting by interchanging or not interchanging the current feedback data includes: a step of interchanging the current feedback data, in a case of the setting for interchanging of the phase rotation of the voltage command data and the connection phase rotation of the motor being consistent, based on a set phase rotation for interchanging of the phase rotation of the voltage command data, and a step of outputting the current feedback data as is without interchanging, in a case of the setting for interchanging of the phase rotation of the voltage command data and the connection phase rotation of the motor not being consistent.

According to a seventh aspect of the present invention, a non-transitory computer readable medium is encoded with a computer program for enabling a computer to operate as a motor control device for controlling a motor of a machine tool, the computer program causing the computer to execute: voltage command output processing of outputting voltage command data that instructs a voltage to be applied to the motor, based on an external instruction; voltage command data interchanging processing of outputting by interchanging or not interchanging the voltage command data, based on a setting for interchanging of a phase rotation of the voltage command data; processing of supplying the voltage command data outputted by the voltage command data interchanging unit to a predetermined amplifier, and driving the motor by the amplifier; current detection processing of detecting electric current flowing through the motor, and outputting current feedback data; and current feedback data interchanging processing of outputting by interchanging or not interchanging the current feedback data, based on the setting for interchanging of the phase rotation of the voltage command data, in which the voltage command data interchanging processing includes: processing of interchanging the voltage command data, in a case of the setting for interchanging of the phase rotation of the voltage command data and the connection phase rotation of the motor being consistent, based on a set phase rotation for interchanging of the phase rotation of the voltage command data, and processing of outputting the voltage command data as is without interchanging, in a case of the setting for interchanging of the phase rotation of the voltage command data and the connection phase rotation of the motor not being consistent, and in which the current feedback data interchanging processing includes: processing of interchanging the current feedback data, in a case of the setting for interchanging of the phase rotation of the voltage command data and the connection phase rotation of the motor being consistent, based on a set phase rotation for interchanging of the phase rotation of the voltage command data, and processing of outputting the current feedback data as is without interchanging, in a case of the setting for interchanging of the phase rotation of the voltage command data and the connection phase rotation of the motor not being consistent.

According to the present invention, it is possible to provide a motor control device, motor control method, and non-transitory computer readable medium encoded with a computer program, which can more safely perform control of the rotation direction of a motor while keeping the connection phase rotation of power lines of a motor in the standard state, and can drive irrespective of the connection phase rotation of motor power lines.

DETAILED DESCRIPTION OF THE INVENTION

Herein, an embodiment of the present invention will be explained based on the drawings.

Positioning of Motor Control Device of Present Embodiment

Figure 1:
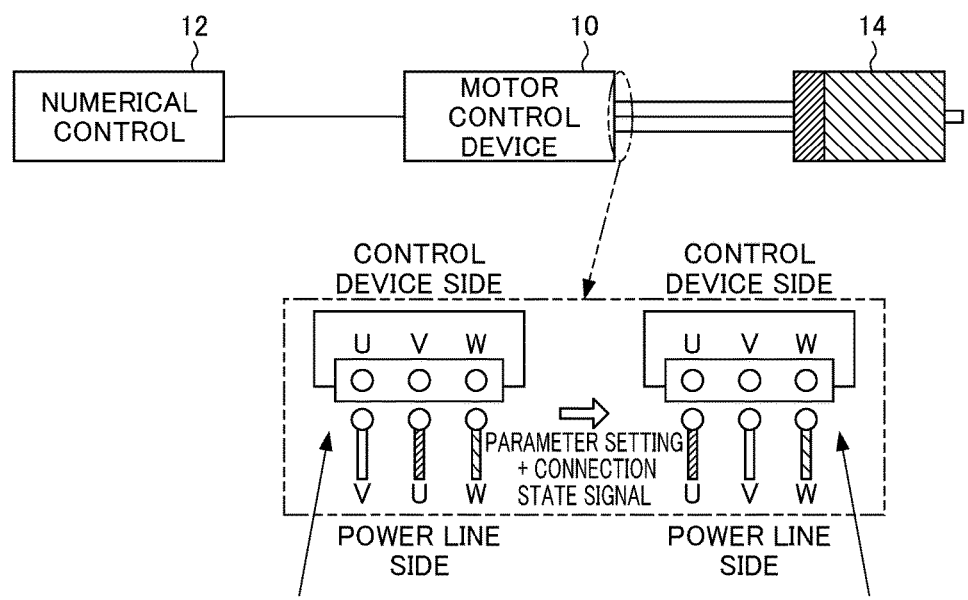
FIG. 1 is a view showing positioning of the motor control device according to an embodiment of the present invention.

The motor control device according to the present embodiment is used in a machine tool. FIG. 1 is an explanatory view expressing positioning of a motor control device 10 according to the present embodiment. The motor control device 10 controls to drive a motor 14 based on instructions outputted by a host numerical control 12. As instructions, for example, it may include torque of the motor 14 (or electric current value expressing torque), and the instructions related to an excitation current of the motor 14 may be included. As instructions, various other contents may be included, for example, and the rotational velocity, angular velocity, etc. can be included. In the example shown in FIG. 1, the motor 14 is a three-phase motor, for example, and the power lines of the motor 14 consist of a U phase, V phase and W phase. These may also be simply called U, V and W.

As already explained, conventionally, there are cases of being forced to make the phase rotation in a different connection than standard, due to the configuration of spindles in a machine tool. In this case, for example, the power lines V, U and W of the motor 14 are connected to the terminals U, V and W on the motor control device 10 side, as shown in FIG. 1(a). In other words, among the three phases, two phases are interchangeably connected. By interchanging two phases in this way (called "interchanging phase rotation"), it reverses the rotational direction of the motor 14.

In this way, even in a case of being forced to make the phase rotation in a different connection from standard due to the configuration of spindles of a machine tool, according to the present embodiment, it is made possible to maintain the connection between the motor control device 10 and motor 14 as a standard connection due to interchanging the phase rotation by internal processing of the motor control device 10. This aspect is shown in FIG. 1(b). As a result thereof, even when the machine tool adopts any configuration of shafts (spindles), it is possible to maintain the connection phase rotation between the motor control device 10 and power lines of the motor 14 in the standard state, and thus maintenance, inspection, etc. are easily conducted.

Figure 2:
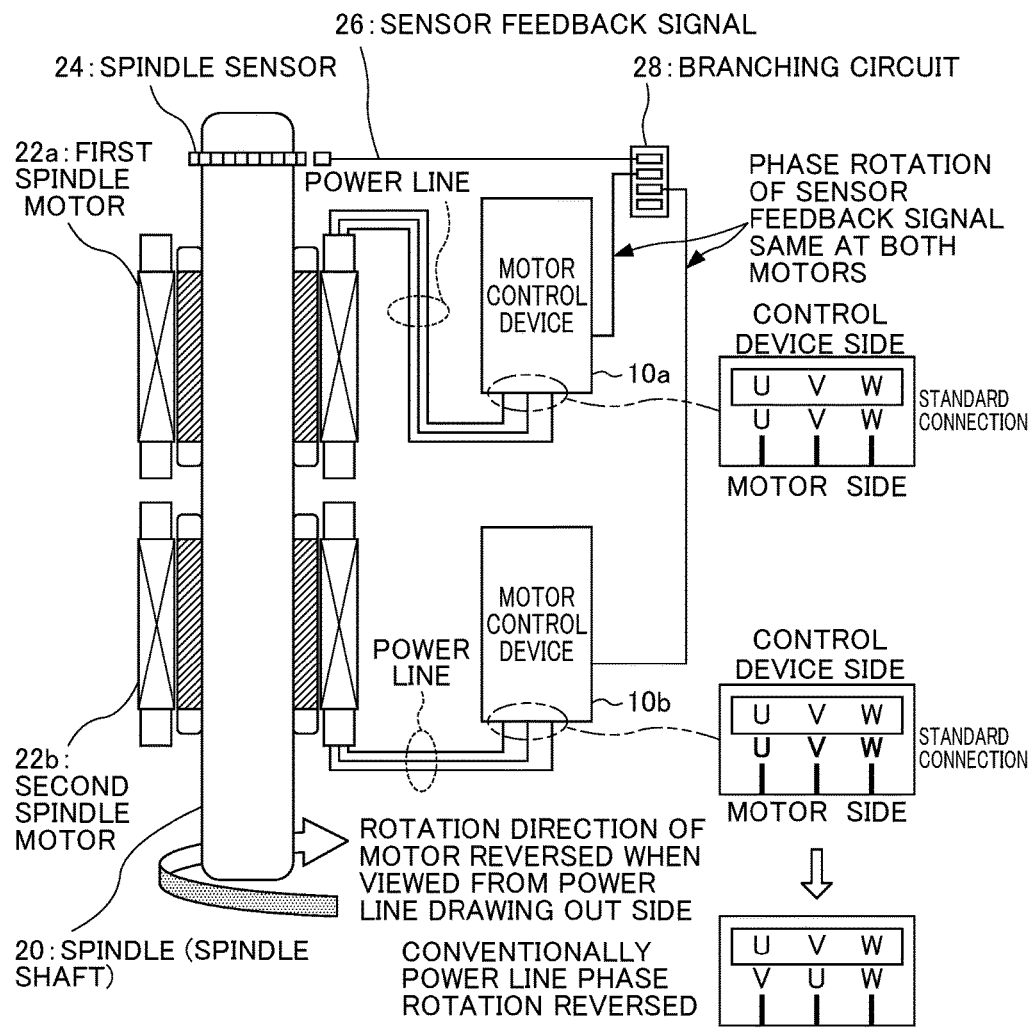
FIG. 2 is a view showing an example of a case requiring to make the phase rotation differing from standard due to the configuration of the machine tool spindles.

Examples of Mechanical Configuration Preferably Applicable to Present Embodiment Conventionally, an example of a case of being forced to make the phase rotation in a different connection from standard is explained based on FIG. 2. FIG. 2 is a view schematically expressing the configuration in the vicinity of the spindle of the machine tool according to the present embodiment, and shows a configuration example in which two spindle motors 22 are provided to a spindle shaft 20 (also simply called spindle 20). In the example of FIG. 2, the two spindle motors 22a, 22b are provided in order to increase the torque acting on the spindle 20. A spindle sensor 24 is also provided to the spindle 20, which detects the rotation of the spindle, and outputs a sensor feedback signal 26. The sensor feedback signal 26 is branched at a branching circuit 28, and is provided to a first motor control device 10a and a second motor control device 10b. For the sensor feedback signal 26, the same signal is provided to the first motor control device 10a and second motor control device 10b.

In the example of FIG. 2, tandem driving in a master-slave system is performed on the two spindle motors 22a, 22b. In other words, a current command to the first spindle motor 22a which is the master is also notified as is to the second spindle motor 22b which is the slave. In this way, a similar command as the command to the spindle motor 22a which is on the master side is notified to the spindle motor 22b on the slave side.

In the present embodiment, an example will be explained in which the first spindle motor 22a and second spindle motor 22b must be arranged to face each other for convenience in assembly. In the example of FIG. 2, for ease in drawing out the power lines, the first spindle motor 22a and second spindle motor 22b are installed to the spindle 20 to be facing each other (ends on opposite side to power line opposing each other). As a result thereof, in FIG. 2, the power lines of the first spindle motor 22a and second spindle motor 22b are drawn out without interfering with each other. In addition, the power lines of the first spindle motor 22a are connected to the first motor control device 10a, and the power lines of the second spindle motor 22b are connected to the second motor control device 10b. According to such an arrangement, the rotation directions of the first spindle motor 22a and second spindle motor 22b must be opposite in the case of viewing from power line drawing out side.

As a result of such an arrangement and connection, the first spindle motor 22a and sensor feedback signal 26 are a so-called standard arrangement/connection, and the first motor control device 10a to which the sensor feedback signal 26 is supplied can rotationally drive the first spindle motor 22 as normal. On the other hand, the second spindle motor 22b and sensor feedback signal 26 have a so-called reversed connection phase rotation. Herein, please bear in mind for the sensor feedback signal 26 that a single shared signal is supplied both to the first motor control device 10a and second motor control device 10b.

For this reason, the rotational direction of either one of the spindle motors 22 must be changed, and according to conventional technology, for example, it has been necessary to interchange the connections between the power lines of the second spindle motor 22b and motor control device 10b from the standard phase rotation.

In contrast, in the present embodiment, a setting unit that changes the input/output data is provided inside of the motor control device 10, and it is possible to realize a reverse connection state in a soft manner (state interchanging the phase rotation from the standard connection phase rotation), based on the connection state of the spindle motors 22. As a result thereof, according to the present embodiment, it is possible to reverse the rotation direction of the spindle motor 22 with the connection between the power lines of the spindle motor 22 and the motor control device 10 left as standard. Since the connection may be left as standard, maintenance of the machine tool becomes easy to conduct.

It should be noted that, in the case of applying such interchanging of the phase rotation, there is also a possibility of executing unexpected actions in the case of mistaken a setting. For this reason, it is preferable for the motor control device 10 to naturally prevent from executing an unexpected action by monitoring the state of the connection phase rotation of the power lines of the spindle motors 22.

Configuration of Motor Control Device 10

Figure 3:
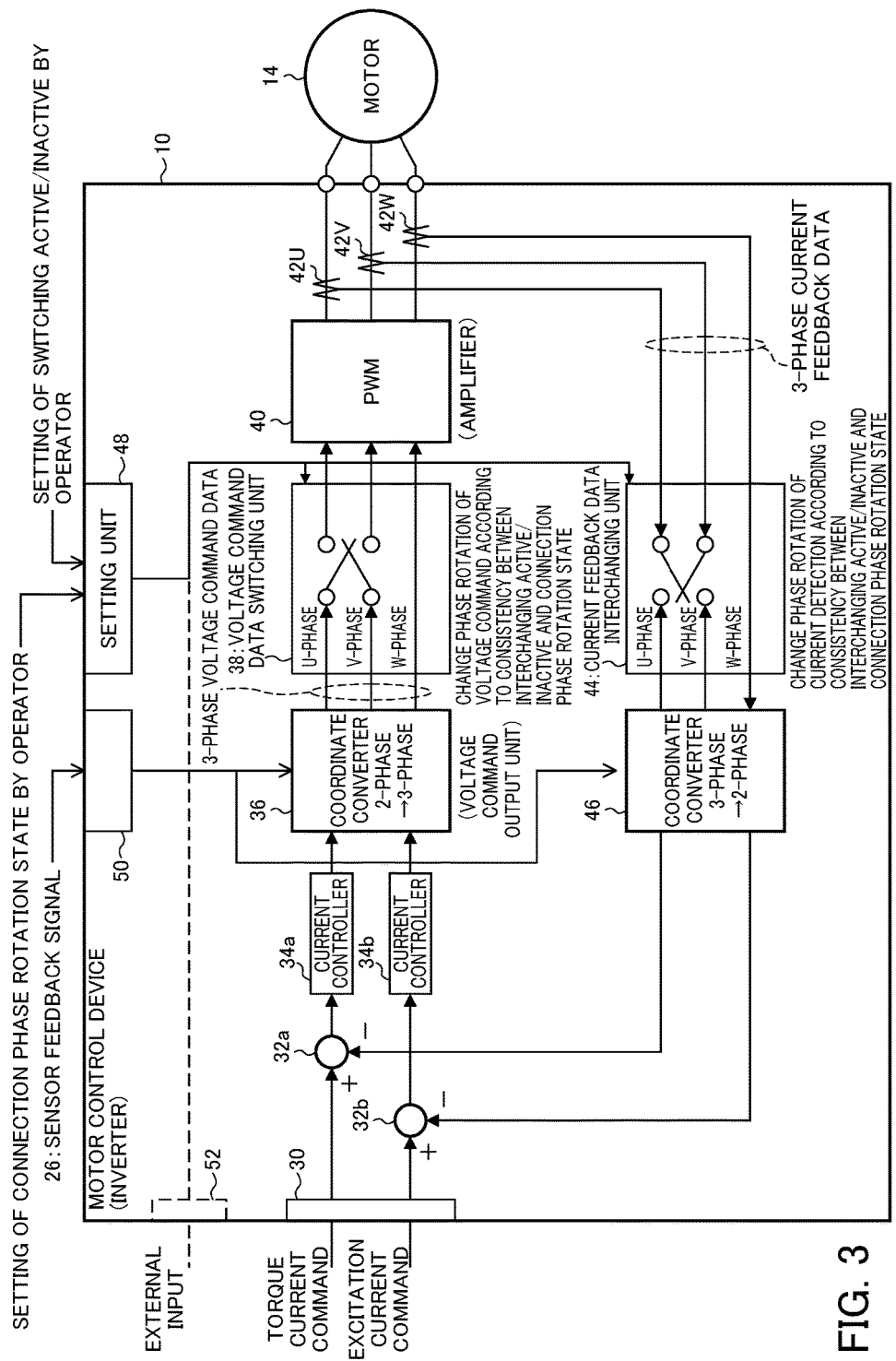
FIG. 3 is a view showing configurational blocks of a motor control device according to the embodiment of the present invention.

FIG. 3 is a view showing constitutional blocks of the motor control device 10. The motor control device 10 includes an interface for receiving a torque current command and excitation current command from the host numerical control 12. Furthermore, the motor control device 10 includes adders 32a, 32b, current controllers 34a, 34b, coordinate converter 36, voltage command data interchanging unit 38, and PWM (Pulse Width Modulation) output unit 40, and outputs drive electric power to the motor 14.

Furthermore, the motor control drive 10 includes current detection parts 42U, 42V and 42W that detect the electric current flowing in the power lines of the motor 14, a current feedback data interchanging unit 44, and coordinate converter 46. In addition, the motor control device 10 includes, setting unit 48 for setting active/inactive for interchanging between the voltage command data interchanging unit 38 and the current feedback signal interchanging unit 44, and an interface 50 for inputting the sensor feedback signal 26.

In addition, the motor control device 10 is preferably constituted by a computer, and the aforementioned interfaces 30, 50 can be constituted by various I/O interfaces used by computers. In addition, the interfaces 30, 50 are not only wired interfaces, and wireless interfaces may be adopted. In addition, it is preferable to realize the torque current command or excitation current command by a digital signal.

In addition, the adders 32a, 32b, current controllers 34a, 34b, coordinate converters 36, and voltage command data interchanging unit 38 can be realized by programs realizing these functions, and a CPU of a computer or the like executing these programs. The PWM output unit 40 can be constituted by hardware such as transistor circuits that supply drive electric power to the motor 14. In addition, the current detection units 42U, 42V, 42V also can employ various sensors for detecting electric current. Furthermore, it is also possible to realize the current feedback signal interchanging unit 44 and coordinate converter 46 from the CPU of the computer, and programs executed by this CPU or the like.

In the motor control device 10 of the configuration shown in FIG. 3, the interface 30 receives the torque current command and excitation current command from the numerical control 12. The interface 30 is a digital I/O interface which is normally used in computers.

The adder 32a subtracts the torque current command obtained based on the current feedback signal from the received torque current command, and outputs this difference. The adder 32b subtracts the excitation current command obtained based on the current feedback signal from the received excitation current command, and outputs this difference. In the present embodiment, the adders 32a, 32b are realized by the CPU of the computer or the like executing predetermined programs; however, it may be configured using a hardware functional unit.

The current controller 34a obtains the corresponding current value based on the difference in the current commands outputted by the adder 32a. The current controller 34b obtains the corresponding current value based on the difference in the current commands outputted by the adder 32b. In the present embodiment, the current controllers 34a, 34b are realized by the CPU of the computer or the like executing predetermined programs; however, it may be configured using various hardware amplifiers.

The coordinate converter 36 converts the two-phase command outputted by the current controller 34 and current controller 34b into three-phase voltage command data (U phase, V phase, W phase). At this time, the coordinate converter 36 references the sensor feedback signal 26 (refer to FIG. 2), and converts the two-phase voltage command into a three-phase voltage command. The sensor feedback signal 26 is supplied to the coordinate converter 36 via the interface 50. The sensor feedback signal 26 in the present embodiment is a pulse signal indicating rotation of the spindle 20 (refer to FIG. 2), and the interface 50, which is a predetermined I/O interface, receives this. The coordinate converter 36 is realized by the CPU of the computer or the like executing a predetermined program. In addition, the coordinate converter 36 corresponds to an ideal example of "voltage command output unit" in the claims.

The voltage command data interchanging unit 38 interchanges the three-phase voltage command data produced by the coordinate converter 36 converting into three phases, as necessary. In the present embodiment, the U phase and V phase are interchanged as necessary. Active/inactive of this interchanging, for example, is set by the operator making a manipulation on the setting unit 48. The setting unit 48 may employ any interface so long as the operator can easily perform the manipulation. For example, using the touch panel, etc., it is ideal for the operator to perform a predetermined setting on the screen of the touch panel.

In addition, to the setting unit 48 according to the present embodiment, a "state of connection phase rotation" may be inputted that indicates how the power lines of the motor 14 are connected to the motor control device 10. This state of connection phase rotation, a case in which the U phase, V phase and W phase match is called "connection phase rotation standard", as explained in FIG. 2. On the other hand, a case in which any of the phases are interchanged is called "connection phase rotation reversed", "connection phase rotation interchanged", etc. For example, at the setting unit 48, the connection phase rotation can be inputted as "standard"/"reversed", etc. according to the parameter input.

In the present embodiment, the motor 14 is premised as having the connection phase rotation of "standard" as a general rule, and the matter of being able to change the rotation direction of the motor 14 while leaving the connection phase rotation as "standard" is one of the characteristic matters of the motor control device 10 according to the present embodiment. However, by also permitting the case of the connection phase rotation of the motor 14 being "reversed", the safety is further raised, while realizing a more flexible configuration.

The voltage command data interchanging unit 38 interchanges (changes) the phase rotation of the three-phase voltage command data outputted by the coordinate converter 36 according to the setting. In the present embodiment, the voltage command data interchanging unit 38 interchanges the U phase and V phase in the case of the setting of "interchange" for the phase rotation being made in the setting unit 48 to reverse the rotation direction of the motor 14. According to such operations, even in a case of the connection phase rotation of the motor 14 being standard, it is possible to reverse the rotation direction of the motor 14 according to the setting of "interchange".

Furthermore, the voltage command data interchanging unit 38 examines whether the setting related to "interchange" and the connection phase rotation of the motor 14 match, and if inconsistent, can perform an operation such as not driving the motor 14. This is in order to prevent from making an accidental operation due to a setting mistake. This will be explained in detail hereinafter.

Case of Connection Phase Rotation of Motor 14 Being Standard

For example, in the case of the connection phase rotation of the motor 14 being "standard", and the setting for interchanging being set to "interchange", the voltage command data interchanging unit 38 interchanges the U phase and V phase. On the other hand, in the case of the setting for interchanging being set to "no interchange", the voltage command data interchanging unit 38 leaves the voltage command data as is as standard without interchanging the U phase and V phase.

Case of Connection Phase Rotation of Motor 14 Being Reversed

On the other hand, in the case of the connection phase rotation of the motor 14 being "reverse", and the setting for interchanging being set to "interchange", the voltage command data interchanging unit 38 causes the motor 14 to stop without interchanging the U phase and V phase. This is because there is a possibility of setting the setting for interchanging in the motor control device 10 to "interchange", as well as interchanging the connection phase rotation of the motor 14, by mistakenly trying the reverse the rotation direction of this motor 14. In this case, the motor 14 is made to stop from the viewpoint of safety. In the present embodiment, this case is called "inconsistent.

In other words, in the case of wanting to reverse rotation of the motor 14, it is sufficient to either one of setting the setting for interchanging to "interchange", or the connection phase rotation of the motor 14 is "reverse", and in the case of both of these being set, there is a possibility of some mistake occurring, and thus is determined as being "inconsistent". Furthermore, the voltage command data interchanging unit 38 may generate an alarm externally, along with causing the motor 14 to stop. As the alarm, a warning sound or a voice message and other sounds are preferred, and may be a warning light of a predetermined light flickering or a rotating lamp. If a warning, any kind of voice or light may be employed. In addition, a method may be adopted such as a warning email, FAX, etc. being automatically sent to a predetermined address.

In the case of the connection phase rotation of the motor 14 being "reverse", and the setting for interchanging being set to "no interchange", the voltage command data interchanging unit 38 leaves the voltage command data as is as standard, without interchanging the U phase and V phase. In this case, according to a conventional method, it is determined that a method such that reverses the rotation direction by setting the connection phase rotation of the motor 14 to "reverse" is adopted. The voltage command data interchanging unit 38 can be realized by the CPU of the computer, etc. executing a predetermined program.

The PWM output unit 40 converts the three-phase voltage command data interchanged by the voltage command data interchanging unit 38 as appropriate, into a PWM signal. This PWM output unit 40 is a circuit that converts the voltage command data into a PWM signal, and converts the converted PWM signal into sufficient electric power for driving the motor 14. Therefore, this PWM output unit is configured by a conversion circuit that converts the voltage command into a PWM command, and a semiconductor circuit such as a transistor that power amplifiers the PWM signal. The conversion circuit converting into a PWM command may be realized as a digital circuit, may be realized by the CPU of the computer executing a predetermined program, and may be realized by configuring so as to generate a PWM signal based on a voltage command. It should be noted that the PWM output unit 40 corresponds to an ideal example of "amplifier" in the claims.

The current detection units 42U, 42V, 42W are sensors that detect the electric current value supplied to the power lines of the motor 14 from the PWM output unit 40. As this sensor, a sensor that detects the electric current value as digital data is preferable. In the current feedback data interchanging unit 44, it is possible for the computer to directly interchanges this data.

It should be noted that the current detection units 42U, 42V, 42W can employ sensors that detect the electric current value as analog data. In this case, it is preferable to include a converter that converts the analog data into digital data in the input unit of the current feedback data interchanging unit 44.

The current feedback data interchanging unit 44 interchanges the three-phase current feedback data detected by the current detection unit 42 based on a predetermined setting for interchanging. This setting for interchanging is setting contents that were set by the operator at the setting unit 48, similarly to the aforementioned voltage command data interchanging unit 38. Then, by similar rules as the aforementioned voltage command data interchanging unit 38, the three-phase current feedback data is interchanged.

The operation of the interchanging of the three-phase feedback data executed by the current feedback data interchanging unit 44 is substantially the same as the operation for interchanging of the aforementioned voltage command data interchanging unit 38. In the case of the interchanging of the U phase and V phase being performed in the voltage command data interchanging unit 38, interchanging of the U phase and V phase is also performed in the current feedback data interchanging unit 44. In addition, in the case of interchanging of the U phase and V phase not being performed in the voltage command data interchanging unit 38, interchanging of the U phase and V phase is also not performed in the current feedback data interchanging unit 44.

However, the current feedback data interchanging unit 44, contrary to the voltage command data interchanging unit 38, does not execute an alarm. This is because it is sufficient so long as either one configuration executed the alarm. In the present embodiment, it is configured so that the voltage command data interchanging unit 38 outputs an alarm; however, the current feedback data interchanging unit 44 may execute in place of the voltage command data interchanging unit 38. It should be noted that this current feedback data interchanging unit 44 can be realized by the CPU of the computer, etc. executing a predetermined program.

The coordinate converter 46 converts the three-phase signal (U phase, V phase, W phase) outputted by the current feedback interchanging unit 44 into a two-phase feedback signal (torque current feedback signal, excitation current feedback signal). This processing becomes the reverse operation of the coordinate converter 36. In the coordinate converter 46, coordinate conversion is performed similarly to the coordinate converter 36, using the sensor feedback signal 26.

The converted torque current command and excitation current command are used in feedback control by taking the difference between the torque current command and excitation current command inputted by the interface 30. The converted torque current command is outputted to the adder 32a. In addition, the converted excitation current command is outputted to the adder 32b.

According to the aforementioned such configuration, it is possible to reverse the rotation direction of the motor 14 while maintaining a state in which the motor 14 is connected to the motor control device 10 as standard. As a result thereof, it is no longer necessary to interchange the power lines of the motor 14 relative to the motor control device 10, and thus repair and maintenance become easily performed.

It should be noted that, in the above explained example, the setting for interchanging is set by a parameter input on the setting unit 48; however, it may be set from external equipment. For example, the setting for interchanging and connection phase rotation may be set from an external terminal (notebook computer, etc.) connected with the motor control device 10 (for example, LAN connection, WiFi (registered trademark) connection). The external input signals of various places set in this case (setting for interchanging, connection phase rotation), etc. may be stored in a predetermined storage unit inside of the motor control device 10. Such a storage unit may be put in a storage device in which predetermined programs realizing the voltage command data interchanging unit 38, etc. are stored. In addition, as the external terminal, a so-called smartphone or tablet computer may be used.

Furthermore, although the above explained example explains an example of interchanging the U phase and V phase, any two phases may be interchanged. For example, it may be configured so as to interchange the V phase and W phase.

Operation

Figure 4:
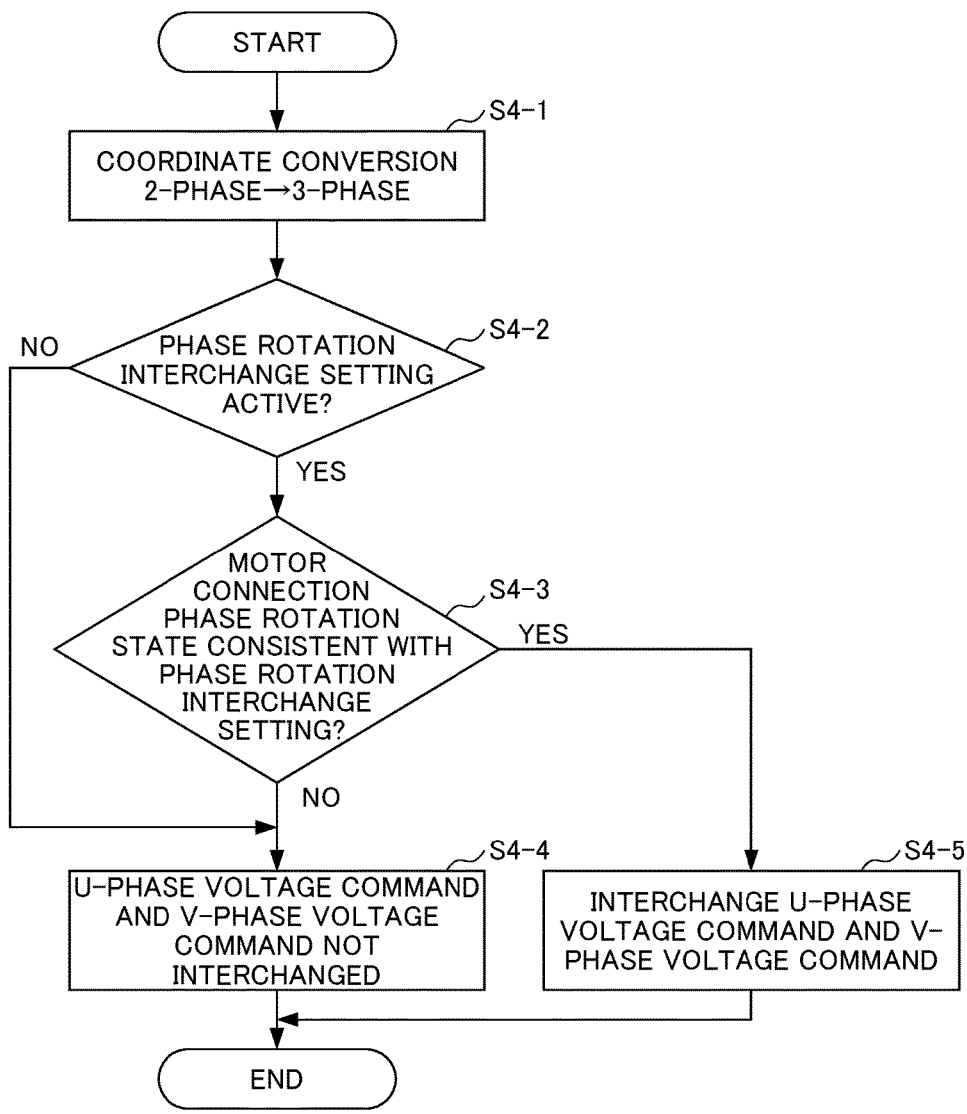
FIG. 4 is a view showing a flowchart expressing operations of the motor control device according to the embodiment of the present invention related to interchanging of voltage command data.

An example of the operations of the motor control device 10 shown in FIG. 3 will be explained based on the flowchart. The device configuration is assumed to be connected by the configuration shown in FIGS. 1 and 2. FIG. 4 is a flowchart showing an example of operations of the motor control device 10 related to interchanging of the voltage command output data.

First, in Step S4-1, the coordinate converter 36 converts the torque current command and excitation current command into three-phase voltage command data.

In Step S4-2, the voltage command data interchanging unit 38 examines whether or not the setting for interchanging set in the setting unit 48 has become "interchange". As a result of examination, in the case of setting for interchanging being active (case of "interchange" setting being made), the processing advances to the next Step S4-3, and in case of setting for interchanging not being active (case of "no interchange" setting being made), the processing advances to Step S4-4.

In Step S4-3, the voltage command data interchanging unit 38 confirms the setting of "connection phase rotation" of the motor 14 set on the setting unit 48, and examines whether the contents thereof are consistent with the setting for interchanging. As a result of examination, in the case of the setting of the connection phase rotation not being consistent with the setting for interchanging (case of inconsistent), the processing advances to Step S4-4. As mentioned above, in the case of the setting of "connection phase rotation" of the motor 14 being "reverse", and the setting for interchanging being active (case of "switch" setting being made), the voltage command data interchanging unit 38 determines as being "inconsistent". It should be noted that cases other than this are determined as "consistent". Therefore, in the case of the setting of "connection phase rotation" of the motor 14 being "standard" in Step S4-3, the processing advances to Step S4-5. In other words, this is because Step S4-3 is a step selected in the case of the setting for interchanging being active (case of "interchange" setting being made).

In Step S4-4, the voltage command data interchanging unit 38 outputs the U-phase voltage command data and V-phase voltage command data as is without interchanging to the PWM output unit 40. In Step S4-5, the voltage command data interchanging unit 38 interchanges the U-phase voltage command data and V-phase voltage command data, and outputs as is to the PWM output unit 40. According to whether or not a setting for interchanging of the voltage command value is made, and whether the state of the connection phase rotation of the motor 14 is "standard" or "reverse", it is determined whether interchanging of the voltage command data is performed/not performed.

Figure 5A:
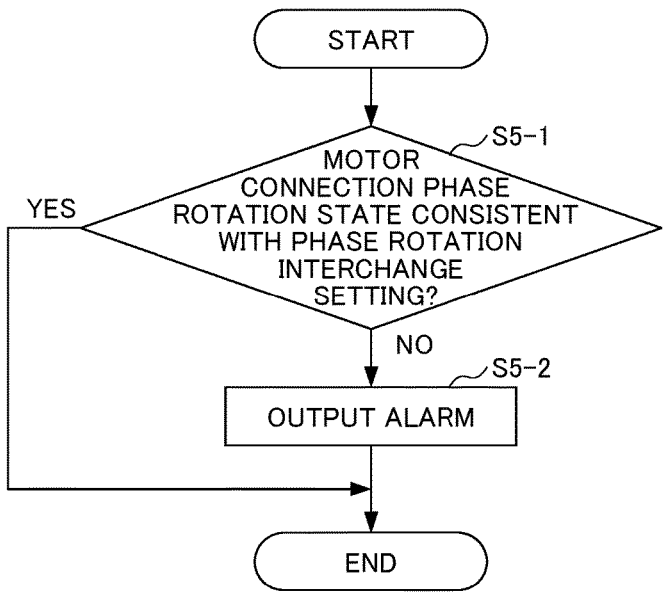
FIG. 5A is a view showing a flowchart expressing operations of the motor control device according to the embodiment of the present invention related to output of an alarm.

Next, operations of output of an alarm will be explained. An example of output operations of an alarm is shown in the flowchart of FIG. 5A.

In Step S5-1, the voltage command data interchanging unit 38 examines whether the setting for interchanging of the phase rotation of the voltage command data and the connection phase rotation of the motor 14 are consistent. As mentioned above, in the case of the phase rotation of the voltage command data being set to "interchange", and the connection phase rotation of the motor 14 being set to "reverse" rather than standard, it is determined as "inconsistent", and cases other than this are determined as "consistent". In the case of inconsistent, the processing advances to Step S5-2, and in the case of not being inconsistent (case of consistent), the processing is ended as is without outputting an alarm.

In Step S5-2, the voltage command data interchanging unit 38 outputs an alarm. The alarm may be any means so long as being able to inform of an abnormal state. It may be sound and/or light, and may be the transmission of a warning email, etc. In addition, in the present embodiment, although the voltage command data interchanging unit 38 outputs an alarm, a means other than the voltage command data interchanging unit 38 may output the alarm. In addition, it may be configured so that the setting unit 48 outputs an alarm, or may be configured so that the setting unit outputs an alarm upon the operator making a setting manipulation, for example. In this way, the output operation of the alarm shown in FIG. 5A is intended to output an alarm in the case of there being an error in the setting, whereby the operator can know that there is an error in the setting.

Figure 5B:
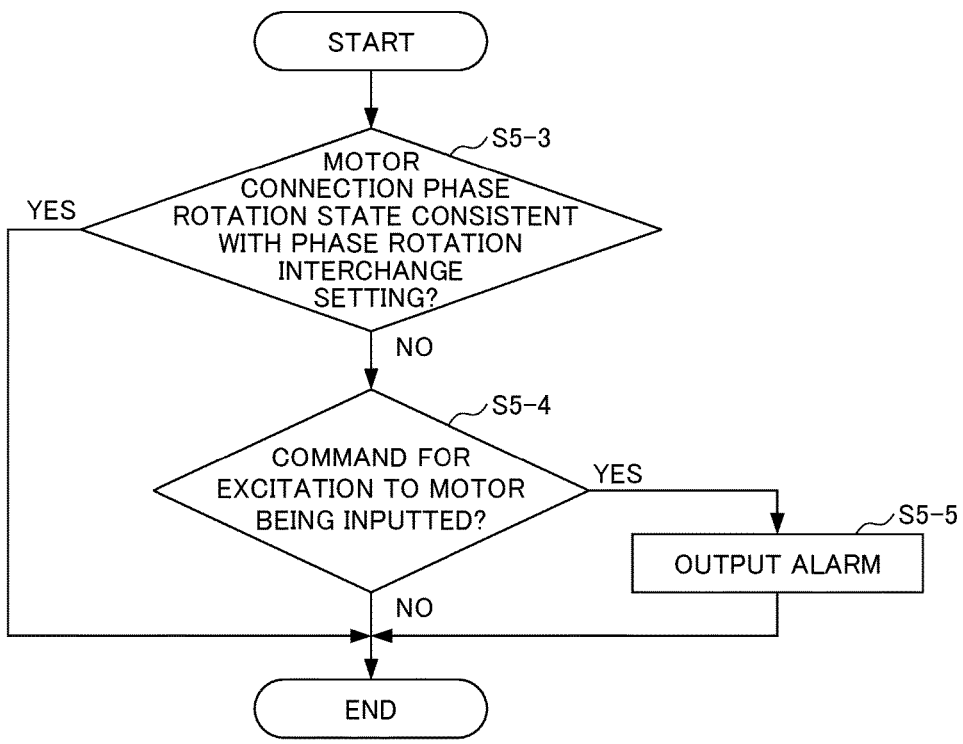
FIG. 5B is a view showing a flowchart expressing other operations of the motor control device according to the embodiment of the present invention related to output of an alarm.

Next, another example of output operations of the alarm is shown in the flowchart of FIG. 5B. The operation in Step S5-3 is substantially the same as the above-mentioned Step S5-1. The voltage command data interchanging unit 38 examines whether the setting for interchanging of the phase rotation of the voltage command data and the connection phase rotation state of the motor 14 are consistent, and if consistent, ends without outputting an alarm. On the other hand, in the case of not being consistent (inconsistent), the processing advances to Step S5-4.

In Step S5-4, the voltage command data interchanging unit 38 examines whether or not a command for excitation to the motor 14 (excitation current command; refer to FIG. 3) is being inputted. As a result thereof, in the case of an excitation current command being inputted, the processing advances to Step S5-5. On the other hand, in the case of an excitation current command not being inputted, it is ended without outputting an alarm. The operation of Step S5-5 is similar to the above-mentioned Step S5-2, and a predetermined alarm is outputted.

In this way, the output operation of the alarm shown in FIG. 5B is intended to output an alarm in the case of being concern over a dangerous operation actually occurring, in addition to there being an error in the setting. In other words, the output operation of the alarm shown in FIG. 5B is configured so as to determine that a dangerous operation will not occur and not to output an alarm, in the case of excitation current not being applied to the motor 14, even if there is an error in the setting.

Figure 6:
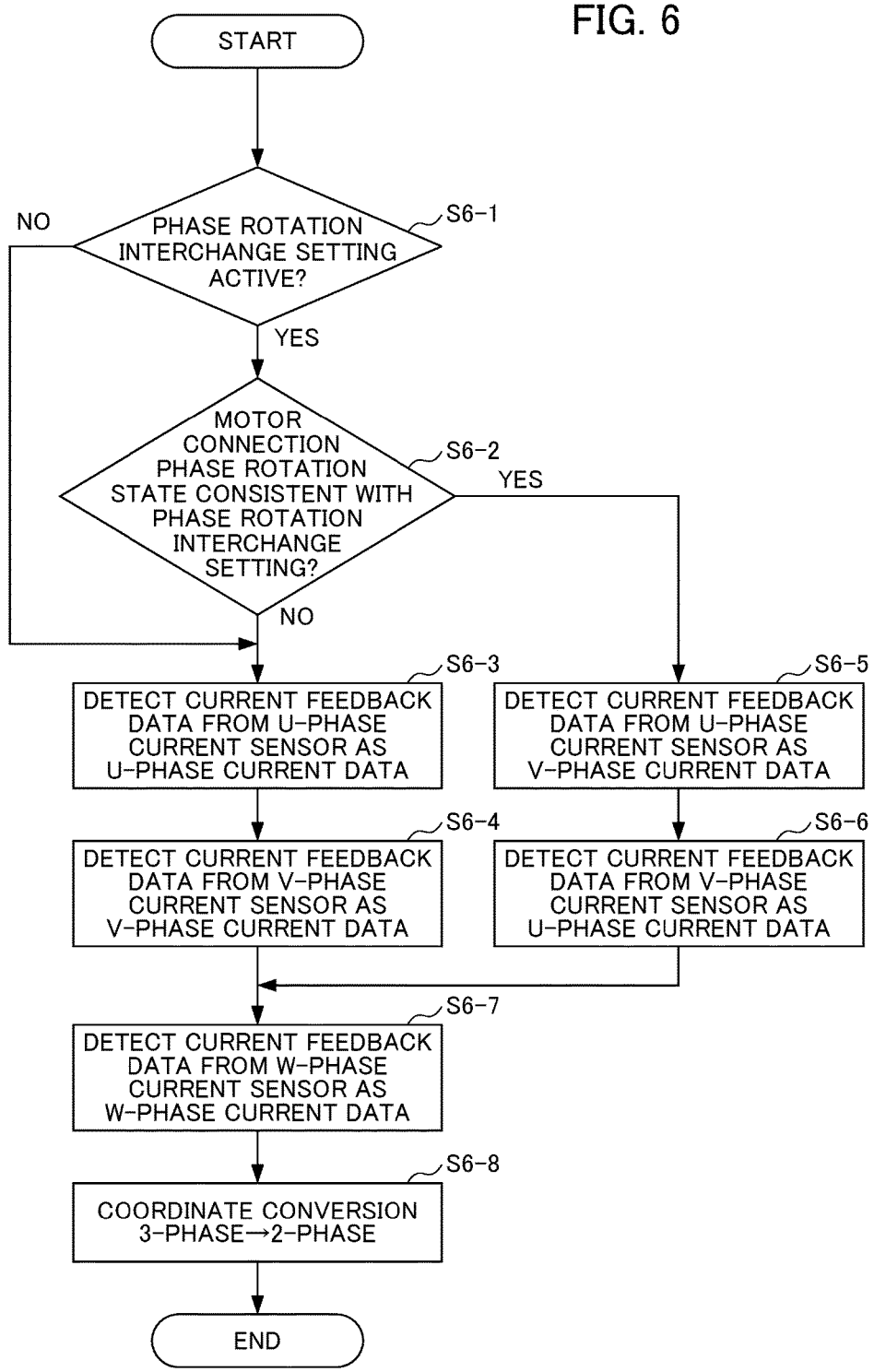
FIG. 6 is a view showing a flowchart expressing operations of the motor control device according to the embodiment of the present invention related to a current detection unit.

FIG. 6 shows a flowchart showing an example of operations of the motor control device 10 based on operations of the current detection unit 42. The current detection unit 42 operates independently, similarly to other configurations of the motor control device 10, and always detects the electric current flowing in the power lines of the motor 14.

In the flowchart of FIG. 6, first, Steps S6-1 and S6-2 are processing similar to Steps S4-2 and S4-3 in FIG. 4, if the setting for interchanging of the phase rotation is active, and the setting for interchanging the phase rotation is consistent with the connection phase rotation of the motor 14, the processing advances to Step S6-5 in order to execute the processing for interchanging the phase rotation. On the other hand, in the case of the setting for interchanging of the phase rotation not being active, or the setting for interchanging and the connection phase rotation being inconsistent, the processing advances to Step S6-3 in order to execute processing for not interchanging the phase rotation.

In Step S6-3 and Step S6-4, the current feedback data interchanging unit 44 outputs the three-phase current feedback data detected by the current detection unit 42 as is to the coordinate converter 46, without interchanging. In other words, in Step S6-3, the current feedback data interchanging unit 44 outputs the current feedback data detected by the current detection unit 42U (U-phase current sensor) to the coordinate converter 46 as the U-phase current data as is.

In Step S6-4, the current feedback data interchanging unit 44 outputs the current feedback data detected by the current detection unit 42V (V-phase current sensor) to the coordinate converter 46 as the V-phase current data as is.

In Step S6-5 and Step S6-6, the current feedback data interchanging unit 44 interchanges the three-phase current feedback data detected by the current detection unit 42, and outputs to the coordinate converter 46. In other words, in Step S6-5, the current feedback data interchanging unit 44 interchanges the current feedback data detected by the current detection unit 42U (U-phase current sensor), and outputs to the coordinate converter 46 as the V-phase current data. In Step S6-6, the current feedback data interchanging unit 44 interchanges the current feedback data detected by the current detection unit 42V (V-phase current sensor), and outputs to the coordinate converter 46 as the U-phase current data.

In Step S6-7, the current feedback data interchanging unit 44 outputs the current feedback data detected by the current detection unit 42W (W-phase current sensor) to the coordinate converter 46 as the W-phase current data as is without interchanging.

In Step S6-8, the coordinate converter 46 converts the U-phase, V-phase and W-phase current feedback data into two-phase signals, i.e. torque current command and excitation current command, and supplies to the adders 32a, 32b. According to such operations, it is possible to perform so-called feedback control on the electric current value, and thus the electric current value flowing to the motor 14 can be controlled.

As explained above, according to the present embodiment, by interchanging the phase rotation of the I/O data (three-phase voltage command data, or three-phase current feedback data) inside of the motor control device 10, it is possible to drive the motor while keeping the connection phase rotation of power lines of the motor with the motor control device as a standard state, even in the case of a machine tool adopting any spindle configuration. In particular, according to the present embodiment, since it is examined as to whether the phase rotation for interchanging and the connection phase rotation are consistent, the possibility of being able to prevent abnormal driving of the motor due to a setting error or the like improves.

In addition, the motor control device 10 according to the present embodiment is preferably mainly constituted by a computer, and the present motor control device 10 can be constituted by including an interface 30 and setting unit 48 outside of the computer, and including a PWM output unit 40 serving as an amplifier supplying electric power to the motor 14. In this case, each part inside of the motor control device 10 can be constituted by programs constituting each part, and a CPU (of the computer) executing these programs, as mentioned above. These programs are preferably stored in a predetermined storage unit inside of the computer. For example, they may be stored in memory or a hard disk, SSD (Solid State Disk), etc. In addition, these programs may be stored in an external storage device. For example, it may be stored in a storage device on a network, or may be configured so as to be executed by the CPU by downloading into the motor control device 10 as appropriate. Herein, a non-transitory computer readable medium encoding these programs corresponds to an ideal example of a non-transitory computer readable medium encoding a computer program in the claims.

In the above-mentioned embodiment, the operator sets the setting for interchanging of the phase rotation by a parameter input on the setting unit 48; however, it may be configured so as to enable setting from another external device. For example, it may be configured so as to prepare an interface 52 (refer to FIG. 3), and the numerical control 12 to send the setting for interchanging, etc. In this case, the motor control device 10 includes a storage unit that stores the sent setting, and the voltage command data interchanging unit 38 or current feedback data interchanging unit 44 may operate by referencing this stored setting.

The interfaces 30, 50 and 52 are explained as examples of I/O interfaces; however, rather than I/O interfaces, they may employ network interfaces (e.g., Ethernet (registered trademark)), for example.

The connection phase rotation of the motor may be provided to the motor control device 10 by various methods. Similarly to the setting for interchanging, it may be configured so as to receive the provision from various external terminals, and may be configured so that the connection phase rotation is sent from a host control device (e.g., numerical control 12). In addition, it may be made a configuration such that provides sensors to connection terminals to which the power lines of the motor are connected, and reads how the power lines are connected to the motor control device 10 directly by sensors of the motor control device 10.

Although an embodiment of the present invention has been explained above in detail, the aforementioned embodiment is merely showing a specific example upon implementing the present invention. The technical scope of the present invention is not to be limited to the embodiment. The present invention is capable of various modifications of a scope not departing from the gist thereof, and these are also encompassed in the technical scope of the present invention.

EXPLANATION OF REFERENCE NUMERALS 10, 10a, 10b motor control device
12 numerical control
14 motor
20 spindle (spindle shaft)

22 spindle motor
22a first spindle motor
22b second spindle motor
24 spindle sensor
26 sensor feedback signal
28 branching circuit
30, 50, 52 interface
32a, 32b adder
34a, 34b current limiter
36 coordinate converter
38 voltage command data interchanging unit
40 PWM output unit
42U, 42V, 42W current detection unit
44 current feedback data interchanging unit
46 coordinate converter
48 setting unit

What is claimed is:

1. A motor control device for controlling a motor of a machine tool, comprising:
  a voltage command output unit that outputs voltage command data instructing a voltage to be applied to the motor, based on an external instruction;
  a voltage command data interchanging unit that outputs the voltage command data by interchanging or without interchanging, based on a setting for interchanging of a phase rotation of the voltage command data;
  an amplifier that drives the motor based on voltage command data outputted by the voltage command data interchanging unit;
  a current detection unit that detects electric current flowing through the motor, and outputs current feedback data;
  a current feedback data interchanging unit that outputs the current feedback data by interchanging or without interchanging, based on a setting for interchanging of phase rotation of the voltage command data,
  wherein the voltage command data interchanging unit:
  interchanges the voltage command data, in a case of the setting for interchanging of the phase rotation of the voltage command data and the connection phase rotation of the motor being consistent, based on a set phase rotation for interchanging of the phase rotation of the voltage command data, and
  outputs the voltage command data as is without interchanging, in a case of the setting for interchanging of the phase rotation of the voltage command data and the connection phase rotation of the motor not being consistent, and
  wherein the current feedback data interchanging unit:
  interchanges the current feedback data, in a case of the setting for interchanging of the phase rotation of the voltage command data and the connection phase rotation of the motor being consistent, based on a set phase rotation for interchanging of the phase rotation of the voltage command data, and
  outputs the current feedback data as is without interchanging, in a case of the setting for interchanging of the phase rotation of the voltage command data and the connection phase rotation of the motor not being consistent.

2. The motor control device according to claim 1, further comprising a setting unit that sets a setting for interchanging of the phase rotation of the voltage command data,
  wherein the setting unit supplies the setting for interchanging of the phase rotation of the voltage command data to the voltage command data interchanging unit, and the current feedback data interchanging unit.

3. The motor control device according to claim 2, wherein the setting unit detects the connection phase rotation of the motor, and supplies the connection phase rotation of the motor to the voltage command data interchanging unit and the current feedback data interchanging unit.

4. The motor control device according to claim 1,
  wherein the voltage command data interchanging unit outputs an alarm, in a case of the setting for interchanging of the phase rotation of the voltage command data and the connection phase rotation of the motor not being consistent.

5. The motor control device according to claim 1,
  wherein the voltage command data interchanging unit outputs an alarm in a case of the setting for interchanging of the phase rotation of the voltage command data and the connection phase rotation of the motor not being consistent, and a command for flowing excitation current of the motor being outputted externally.

6. A motor control method for controlling a motor of a machine tool, the method comprising the steps of:
  outputting voltage command data that instructs a voltage to be applied to the motor, based on an external instruction;
  outputting by interchanging or not interchanging the voltage command data, based on a setting for interchanging of a phase rotation of the voltage command data;
  driving the motor based on the voltage command data outputted in the step of outputting by interchanging or not interchanging the voltage command data;
  detecting electric current flowing through the motor, and outputting current feedback data; and
  outputting by interchanging or not interchanging the current feedback data, based on the setting for interchanging of the phase rotation of the voltage command data,
  wherein the step of outputting by interchanging or not interchanging the voltage command data includes:
  a step of interchanging the voltage command data, in a case of the setting for interchanging of the phase rotation of the voltage command data and the connection phase rotation of the motor being consistent, based on a set phase rotation for interchanging of the phase rotation of the voltage command data, and
  a step of outputting the voltage command data as is without interchanging, in a case of the setting for interchanging of the phase rotation of the voltage command data and the connection phase rotation of the motor not being consistent, and
  wherein the step of outputting by interchanging or not interchanging the current feedback data includes:
  a step of interchanging the current feedback data, in a case of the setting for interchanging of the phase rotation of the voltage command data and the connection phase rotation of the motor being consistent, based on a set phase rotation for interchanging of the phase rotation of the voltage command data, and
  a step of outputting the current feedback data as is without interchanging, in a case of the setting for interchanging of the phase rotation of the voltage command data and the connection phase rotation of the motor not being consistent.

7. A non-transitory computer readable medium encoded with a computer program for enabling a computer to operate as a motor control device for controlling a motor of a machine tool, the computer program causing the computer to execute:

voltage command output processing of outputting voltage command data that instructs a voltage to be applied to the motor, based on an external instruction;

voltage command data interchanging processing of outputting by interchanging or not interchanging the voltage command data, based on a setting for interchanging of a phase rotation of the voltage command data;

processing of supplying the voltage command data outputted by the voltage command data interchanging unit to a predetermined amplifier, and driving the motor by the amplifier;

current detection processing of detecting electric current flowing through the motor, and outputting current feedback data; and current feedback data interchanging processing of outputting by interchanging or not interchanging the current feedback data, based on the setting for interchanging of the phase rotation of the voltage command data, wherein the voltage command data interchanging processing includes:

processing of interchanging the voltage command data, in a case of the setting for interchanging of the phase rotation of the voltage command data and the connection phase rotation of the motor being consistent, based on a set phase rotation for interchanging of the phase rotation of the voltage command data, and processing of outputting the voltage command data as is without interchanging, in a case of the setting for interchanging of the phase rotation of the voltage command data and the connection phase rotation of the motor not being consistent, and wherein the current feedback data interchanging processing includes:

processing of interchanging the current feedback data, in a case of the setting for interchanging of the phase rotation of the voltage command data and the connection phase rotation of the motor being consistent, based on a set phase rotation for interchanging of the phase rotation of the voltage command data, and processing of outputting the current feedback data as is without interchanging, in a case of the setting for interchanging of the phase rotation of the voltage command data and the connection phase rotation of the motor not being consistent.

\* \* \* \* \*